United States Patent [19]
Witter

[11] Patent Number: 5,709,415
[45] Date of Patent: Jan. 20, 1998

[54] QUICK CONNECT DISCONNECT COUPLING

[75] Inventor: Melvin L. Witter, Dallas, Tex.

[73] Assignee: XYZYX International Corporation, Dallas, Tex.

[21] Appl. No.: 709,860

[22] Filed: Sep. 10, 1996

Related U.S. Application Data

[60] Provisional application No. 60/003,670, Sep. 11, 1995.

[51] Int. Cl.$^6$ ........................................ F16L 37/08
[52] U.S. Cl. .................. 285/304; 285/321; 285/322; 285/345
[58] Field of Search .................. 285/304, 321, 285/322, 345

[56] References Cited

U.S. PATENT DOCUMENTS

| | | | |
|---|---|---|---|
| 2,388,056 | 10/1945 | Hendricks | 403/105 |
| 3,151,891 | 10/1964 | Sanders | 285/110 |
| 3,194,316 | 7/1965 | Faulkner | 169/37 |
| 3,314,696 | 4/1967 | Ferguson | 285/174 |
| 3,534,988 | 10/1970 | Lindsey | 285/305 |
| 3,637,239 | 1/1972 | Daniel | 285/321 X |
| 3,847,392 | 11/1974 | Horwinski | 285/302 |
| 3,958,819 | 5/1976 | Tifft | 285/302 |
| 4,071,266 | 1/1978 | Mountford | 285/14 |
| 4,083,410 | 4/1978 | Anderson | 169/37 |
| 4,087,120 | 5/1978 | Rumble | 285/39 |
| 4,340,082 | 7/1982 | Straus | 137/426 |
| 4,378,187 | 3/1983 | Fullerton | 411/267 |
| 4,417,626 | 11/1983 | Hansen | 169/37 |
| 4,635,974 | 1/1987 | Moussaian | 285/305 |
| 4,657,425 | 4/1987 | Takahashi | 403/104 |
| 4,733,890 | 3/1988 | Vyse | 285/321 X |
| 4,783,100 | 11/1988 | Klein | 285/276 |
| 4,802,700 | 2/1989 | Stevenson et al. | 292/327 |
| 4,805,943 | 2/1989 | Balsells | 285/318 |
| 4,813,716 | 3/1989 | Lalikos et al. | 285/174 |
| 4,906,031 | 3/1990 | Vyse | 285/318 |
| 5,002,318 | 3/1991 | Witter | 285/302 |
| 5,005,877 | 4/1991 | Hayman | 285/321 X |
| 5,098,241 | 3/1992 | Aldridge et al. | 411/433 |
| 5,226,682 | 7/1993 | Marrison et al. | 285/308 |
| 5,553,895 | 9/1996 | Karl et al. | 285/321 X |

FOREIGN PATENT DOCUMENTS

| | | | |
|---|---|---|---|
| 0 014 094 | 8/1980 | European Pat. Off. | |
| 0 163 992 | 12/1985 | European Pat. Off. | |
| 1 945 627 | 3/1970 | Germany | |
| 2258950 | 3/1974 | Germany | 285/321 |
| 3831611 | 3/1990 | Germany | 285/321 |

*Primary Examiner*—John A. Ricci
*Attorney, Agent, or Firm*—Brooks & Kushman P.C.

[57] ABSTRACT

A telescopic quick connect disconnect connecter where movement between the telescopic members may be controlled by a pair of springs. The connecter includes telescopic male and female members joined by action of a spring which normally prevents withdrawal of the male member from the female member by being wedged between the camming surface of a recess in the female member and a notch in the male member. A second notch is provided on the male member beyond the female member in which a second spring is placed which will abut against the end of the female member to limit further insertion of the male member into the female member. The latter spring is intended to fail in unusual stress situations such as earthquakes to prevent catastrophic failure of the system. This system is particularly disclosed for use with supply pipes for fire sprinkler systems. Also disclosed is a method for manufacturing the male members and a method for use of the piping.

15 Claims, 4 Drawing Sheets

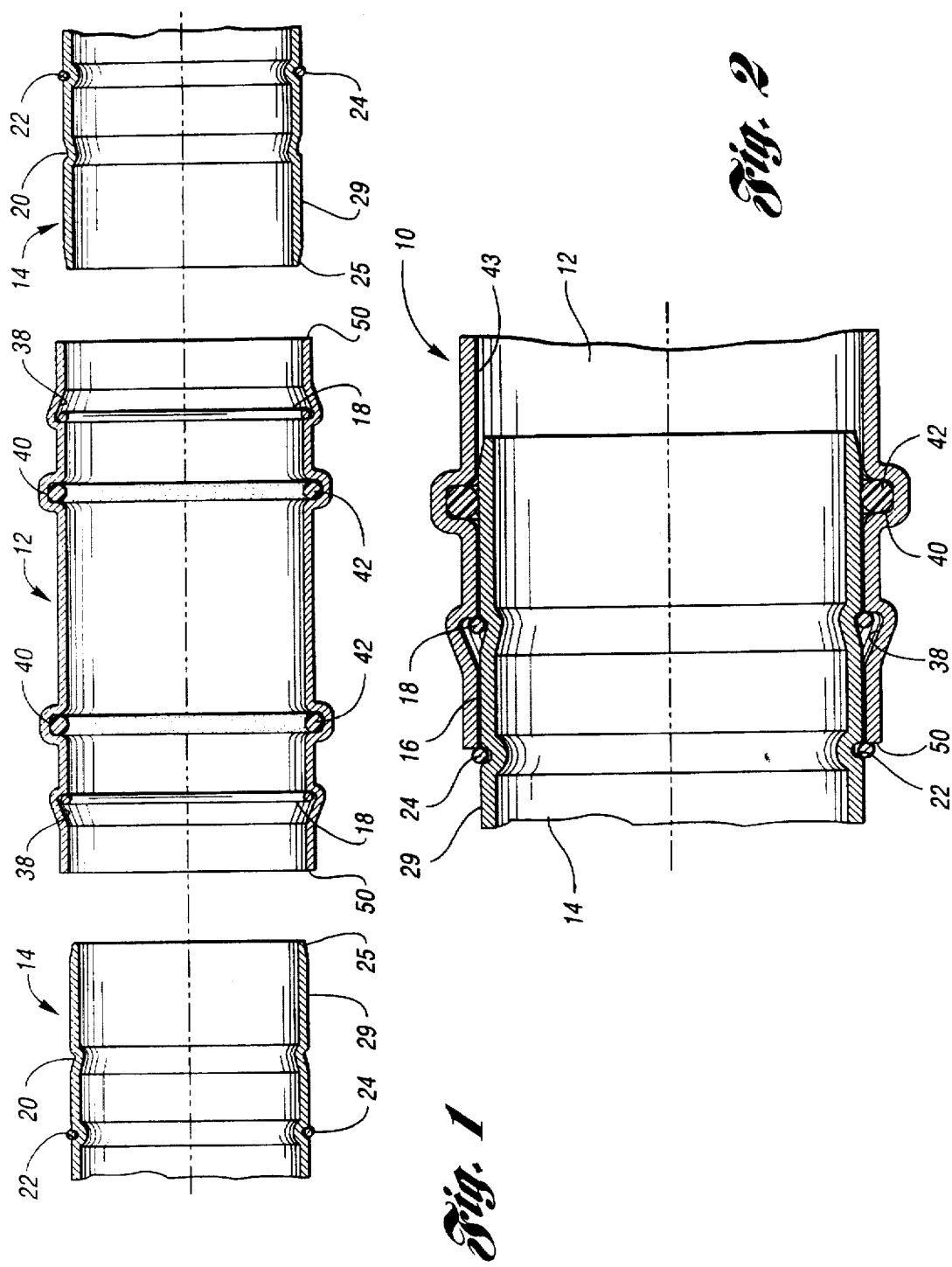

QUICK CONNECT DISCONNECT COUPLING

This application claims the benefit of U.S. Provisional application Ser. No. 60/003,670, filed Sep. 11, 1995.

TECHNICAL FIELD

This invention relates to quick connect disconnect couplings for pipes, their manufacture and use and more particularly with respect to fire sprinkler supply piping couplings and how they may be manufactured and used.

BACKGROUND ART

It is advantageous in piping systems to provide couplings that can be easily connected and disconnected during construction or repair but will provide a firm reliable connection during use. This is particularly the case in fire sprinkling systems. It is also important to ensure that any such coupling is properly positioned so to maintain connection between the pipes while ensuring that accidental uncoupling does not occur. Finally, it is advantageous that in unusual stress situations, such as earthquakes, controlled failure of portions of the coupling mechanism can occur so that the system can be readily restored after the stress situation passes.

DISCLOSURE OF INVENTION

The connecter of the present invention includes a male and female member where the male member is inserted into the female member in a telescopic relationship with a gap interposed between the members with a spring between the members spanning the gap to prevent unintended withdrawal of the male member from the female member. Withdrawal is normally prevented by the spring being wedged between the camming surface of a recess in the female member and a notch in the male member. Insertion of the male member into the female member is controlled by a second notch to which an insertion restraint member normally in the form of a spring is placed. This insertion restraint member will act to abut an end portion of the female member thereby limiting the amount by which the male member may be inserted into the female member.

It is further provided that insertion restraint member is designed to fail at elevated stress levels such as incurred by earthquakes to allow additional movement between the coupling members.

Accordingly, it is an objective of the present invention to provide a quick disconnect coupling where movement between the coupling members may be limited or essentially prevented in an easy efficient manner allowing for later an easy withdrawal of the male member from the female member.

A further object of the present invention is to provide a quick connect disconnect coupling that is subject to controlled failure to avoid catastrophic failure of the system during high stress situations such as earthquakes.

Other objectives, features and advantages of the invention will become readily apparent from the following description and the accompanying drawings.

BRIEF DESCRIPTION OF THE DRAWINGS

FIG. 1 is a cutaway view of an embodiment of the invasion showing a pair of male members and a corresponding female member;

FIG. 2 is an enlarged partial top view of the embodiment of FIG. 1 showing a portion of the female member with a male member inserted therein;

BEST MODE FOR CARRYING OUT THE INVENTION

Figure 3:
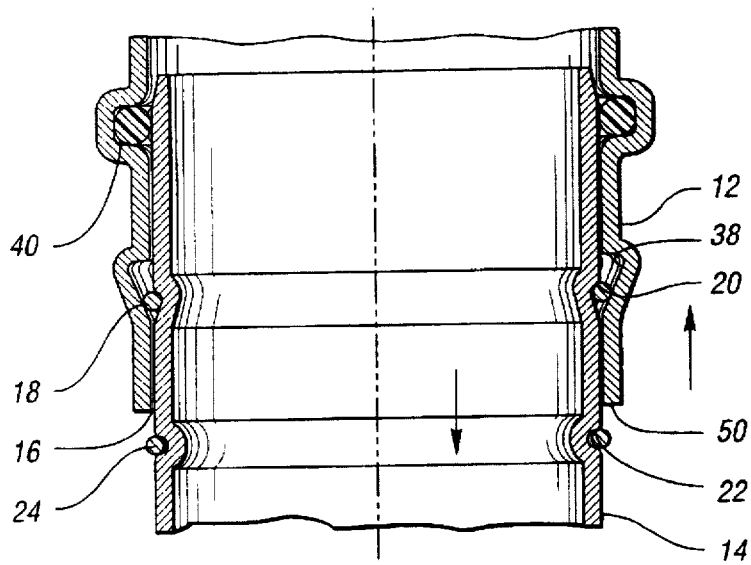
FIG. 3 is an enlarged top view showing the male and female members of FIG. 2 in a position preventing further withdrawal movement of the male member.

The telescopic coupling 10 of the present invention as shown in FIGS. 1–5 has a telescopically engaging female member 12 and male members 14 with a small radial gap 16 between female and male members. Interposed between the female member 12 and the male member 14 is a spring 18 which functions as a locking ring. Preferably, the female members and male members are substantially circular in cross-section throughout the area where they telescopically interact.

FIG. 1 shows a thin walled pipe that forms male member 14 upon which is formed peripherally notch 20 which preferably is roll formed. The male member also has formed axially rearwardly from the notch (i.e. away from the end of the male member which is inserted) a release groove 22. An insertion restraint member 24 is removably positionable in release groove 22. The restraint member preferably takes the form of second spring of the same size and shape as the locking ring 18. The end 25 of the male member is preferably slightly beveled inwardly to aid the insertion of the male member into the female member.

Figure 10:
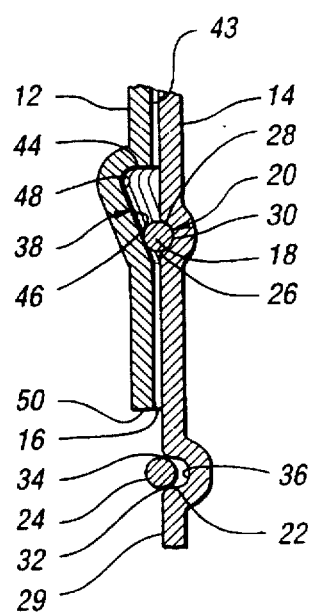
FIG. 10 is an enlarged top view of recess/notch area of FIG. 3.

As best shown in FIG. 10, male member notch 20 includes a rear portion (i.e., furthest from the end being inserted) in the form of a ramp 26 and a shoulder 28 where the notch is closest to the end being inserted (i.e., the forward side of the notch). The shoulder preferably extends at substantially a 90° angle radially inwardly from the side of the male member corresponding to its outer diameter 29. Between the ramp 26 and the shoulder 28 is a seat 30 defining notch 20 for spring 18. The depth of the seat must be such that spring 18 when fully seated will still bridge the radial gap 16 between the members. In other words, the effective outer diameter of the spring when fully seated in seat 30 is greater than the inner diameter of the female member 12.

The release groove 22 preferably has a shoulder 32 formed on its rear side (i.e., the side furthest from the end to be inserted). The release groove 22 should also have a second shoulder 34 forward from the first shoulder a distance greater than the diameter of locking ring 18. The groove is thus generally U-shaped so to form a seat 36 for locking ring 18. The depth of seat 36 must be such that the spring 18 can enter the groove sufficiently so as to have an effective outer diameter that will be less than the inner diameter of the female member 12.

Locking ring 18 is preferably a piece of spring wire having a circular cross-section. The diameter of the cross-section must be substantially greater than the radial gap 16 between the members. Wire comprising the locking ring is bent to form a planar arcuate spring defining a circle. There is an opening 19 along the circle between the ends of the spring so to permit mechanical reduction or expansion of the effective diameter of the circle defined by the spring for purposes outlined below. The circle defined by the wire should have a normal (non stressed) effective inner diameter 21 that is less than the outer diameter of the male member and an effective outer diameter 23 that is greater than the inner diameter of the female member.

The female member 12, as shown in FIG. 1, is designed for insertion of a pair of male members and thus has a mirrored pair of indentations 38 and 40 along its inner periphery. The first indentation 38 is a recess that normally holds locking ring 18. The second indentation is sealing cavity 40 which holds a sealing member in the form of O-ring 42.

The female recess has a cross-section whose rear portion (i.e., the portion furthest away from the end of the female member into which the male member is inserted) proceeds radially outwardly at substantially a 90° angle to the inner surface 43 corresponding to its inner diameter so to form shoulder 44. The front end of the cross-section of the recess proceeds more gradually outward to form ramp 46. Between the ramp and shoulder portion of the cross-section, there is a seat 48 in the recess for the locking ring 18. The depth of the recess seat 48 must be greater than the cross-sectional diameter of the locking ring minus the radial gap. In other words, the locking ring must be able to achieve an effective inner diameter while in the recess which is greater than the outer diameter of the male member.

Insertion restraint member 24 is of a size to be maintained partially within the release groove during normal operation while abutting the end 50 of the female member as more fully explained below. The insertion restraint member 24 should include means to allow it to be positioned on and removed from the release groove when desired and preferably removed entirely from the male member outwardly in a radial direction. To accomplish this, a second locking ring having the same dimensions, opening and characteristics as locking ring 18 preferably will be used. In such a case, opening 19 of the locking ring should be of sufficient size to allow the spring after suitable mechanical expansion to be radially positioned on and removed from the male member when so desired. The opening should be sufficiently small to prevent inadvertent removal. The opening, when using AMS-5112 spring wire (ASTM Q2W470), should preferably be not less than 55° nor more than 75°. The preferred opening is approximately 60°. Alternatively, a ring of such size or shape may be used so that no matter how it is positioned in the release groove, a portion will bridge the gap so to abut the end of the female member. At certain predetermined stresses, such as incurred during earthquakes, it may be desirable for the insertion restraint member to fail in a controlled manner to allow for increased movement of the piping system. The portion bridging the gap may be frangible so that under the predetermined stresses, the part abutting the female member will break. This will allow the combined length of the coupling to move and shorten during the stress situation. However, even during such increased stress, the locking ring 18 in conjunction with notch 20 and recess 38, acts to prevent separation as described below. After the stress situation passes, the restraint member may be restored or replaced.

To use the coupling, a pair of O-ring 42 and locking rings 18 are positioned within the female member in cavities 40 and recesses 38, respectively. End 25 of one of the male members is then positioned within the end 50 of the female member. At this time, the insertion restraint member may be positioned in release groove 22. The male member is then further inserted into the female member until locking ring 18 enters into notch 20 as shown in FIG. 2. At this time, if the male member is attempted to be withdrawn, as shown in FIG. 3, the shoulder 28 of notch 20 will act to pull the locking spring rearwardly. As it abuts and moves along ramp 46 of the recess 38, the locking ring will become fully seated within the notch and wedged by ramp 46. This will prevent withdrawal of the male member any further.

Figure 4:
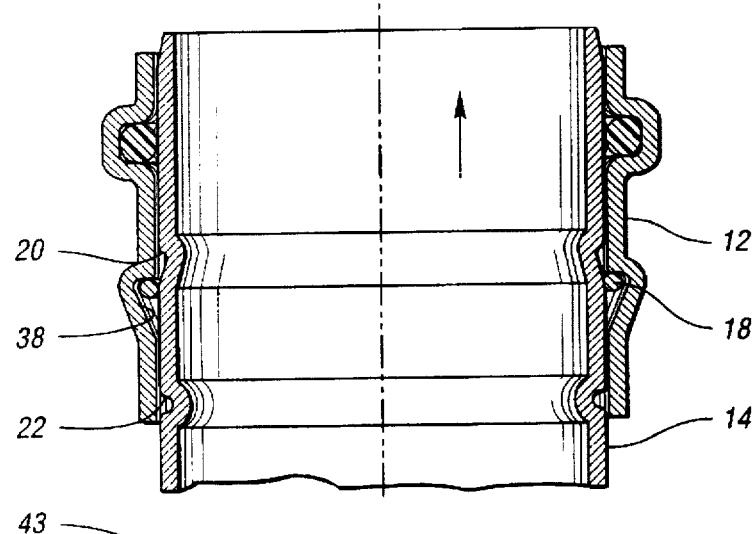
FIG. 4 is an enlarged top view of the male and female members of FIG. 2 showing how inward movement may be allowed.

In certain limited circumstances, it may be desired to insert the male member so that the notch moves beyond the locking ring, as shown in FIG. 4. This may be accomplished when the insertion restraint member 24 is not positioned within release groove 22. In such case, as the male member is further inserted, shoulder 44 of the recess 38 prevents the locking ring from continuing to move further into the female member. Ramp 26 of the notch causes the effective diameter of the locking spring to increase so that it moves more fully into recess 38. This continues until the effective inner diameter of the locking ring is greater than the outer diameter of the male member. The female member 12 may include stops (not shown) extending inwardly from its inner periphery to prevent insertion of the male members beyond the stop.

Figure 5:
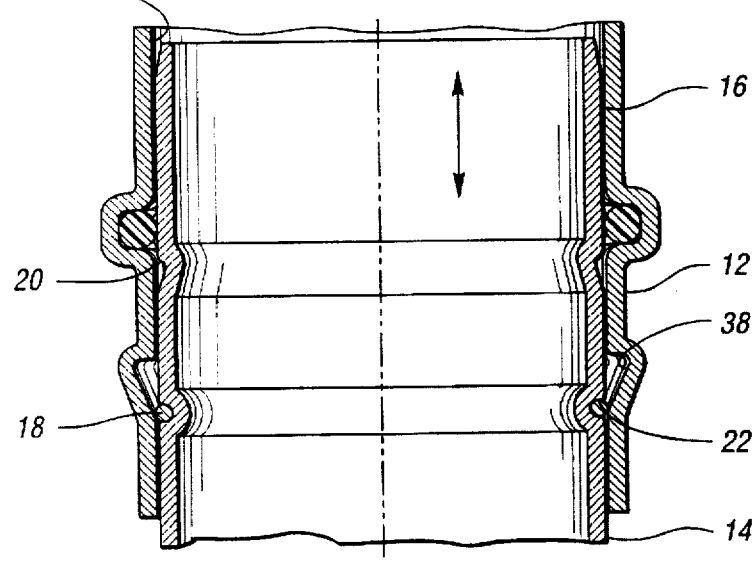
FIG. 5 is a partial top view of the male and female members of FIG. 2 showing how the male member may be withdrawn from the female member.
Figure 6:
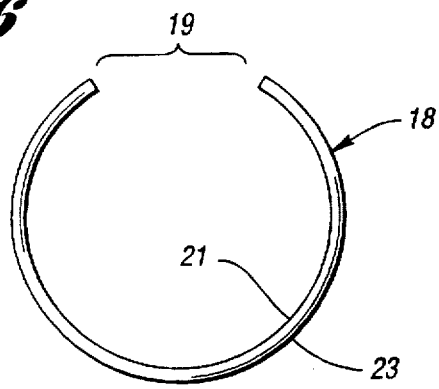
FIG. 6 is a side view of the locking spring used in the coupling.

To remove the male member, the male member is inserted sufficiently into the female member so that locking ring becomes aligned with release groove 22. Once that occurs, the male member may be withdrawn with the recess ramping portion 46 acting to force the locking ring into the release groove as it is withdrawn until the effective outer diameter of the locking ring is less than the inner diameter of the female member as shown in FIG. 5. Thus, the male member is removed.

The length of male member between its end 25 and notch 20 must be sufficient so that while the notch is aligned with the recess O-ring 42 abuts the outer periphery of the male member thereby sealing radial gap 16 against fluid flow through the gap.

The distance of the male member from notch 20 to release groove 22 should be at least the distance from the end 50 of the female member to recess 38. Thus, by positioning the insertion restraint member into the recess groove when the locking ring is within both the notch and recess, it is ensured that further insertion of the male member will not be possible so that the male and female member might not be accidently uncoupled. If the distance between the notch and the recess groove equals exactly the distance between where the locking ring is wedged in place and the end of the female member, insertion restraint member also acts to rigidly hold male and female member together. In such a case, it is normally preferable not to put the insertion restraint member in place until after locking ring is seated within notch 20. To ensure proper seating occurs, it is desirable to insert the male member slightly beyond its ultimate wedged position, such as shown in FIG. 4, and then withdraw the male member until it is firmly wedged and then place insertion restraint member in the release groove.

If some limited amount of movement between the male and female members is permissible after installation, the distance between the notch and the release groove may be increased so to allow the insertion restraint member to be placed male member prior to the initial insertion. This is particularly beneficial when overhead installation is involved. Such an arrangement allows positioning of the insertion restraint member in the groove while the pipe is at a more easily maneuvered position. In such a case, as shown in FIGS. 2 and 3, the male member is inserted until the insertion restraint member abuts the end of the female member, the male member may then be slightly withdrawn so to take its wedged position as shown in FIG. 3. If the installer does not move it to its wedged position, once fluid pressure is added to the system, that pressure will normally act to move the male and female member so that the wedged position of FIG. 3 is taken.

While the coupling may be marketed as a whole, the coupling is particularly suited for allowing an installer to make the male members. The male member is designed so that thin wall tubes having a standard diameter may be used to form the male members. Normally, it is intended that the female members be fabricated off site with effective inner diameters corresponding to standardized thin wall tubes that will be used for the male members with a suitable gap. To create the male member suitable for use with the connector, a length of thin wall tubing 56 should be selected. The tube should then be inserted into a chuck 58 capable of rotating the tube at preferably approximately 300 rpm. The jaws 60 on the chuck should be tightened to hold the tube in place. Particularly suited for this purpose is the Ridgid 300A power drive made by the Ridge Tool Company (Ridgid™ is a registered trademark of the Ridge Tool Company). The tube should extend out of the chuck a distance to allow it to be worked upon by tool 62 to be described below. The details of the Ridgid 300A power drive are described in the Ridgid 300A power drive operator's manual and U.S. Pat. Nos. 2,745,670 and 2,756,061 which are incorporated herein by reference.

Once the tube is positioned and the jaws tightened, the tool 62 is inserted in the tube. Tool 62 includes an outer roller 64 and an inner roller 66 joined so they may be tightened towards one another.

Outer roller 64 is essentially cylindrical. It has an abutment 68 extending radially outwardly at one end which allows for positioning of the end of the tube against the abutment. The outer roller further has a slight radially extending ramp 70 between the standard diameter of the roller and the abutment that will act to form the bevel on the male member at its end 25. Also extending radially outwardly from the standard cross-section are a pair of annular ridges 72, 74 each having a cross-section corresponding to the cross-section of the notch and the release groove of the finished male member.

The inner roller 66 has a standard outer diameter but for two corresponding annular troughs 76, 78 similar to the desired notch and release groove of the male member.

The inner roller 66 is freely rotatable about a pin 80 extending out from the tool end body portion 82. The outer roller 64 is freely rotatable about a pin 84 extending outwardly from the tool movable body portion 86. The outer end of the pin 84 is positioned into arm 88 rigidly joined to the movable body portion. The tool movable body portion has a central opening 90 to allow movement along a handle rod 92 that passes through the central opening. The rod is screwed into a threaded opening 94 in the end body portion. Movement of the movable body portion along the rod is restricted by a washer 96 positioned on the handle rod by suitable means such as a pin. The movable body portion is prevented from rotating about the handle rod by means of pin 100 press-fitted into the end body portion so that it extends into the recess 102 in the movable body portion. When the handle rod is placed through the movable body portion and screwed into the end body portion, the pin 100 is placed in recess 102, the inner and outer rollers will then be aligned in a spaced relationship along parallel axes.

Also aligned along the handle rod is a sleeve. The sleeve 104 is positioned on the opposite side of the washer from the end body portion. The sleeve is joined to the movable body portion to prevent relative rotation between the two parts by means of bolt 106 extending through the sleeve and into the removable body portion. The handle rod can freely rotate within the interior of the sleeve movable body portion. However, axial movement of this rod will be transmitted by washer 96 to the sleeve and movable body portion. At the end of the handle rod, opposite the end portion, is screwed the handle grip 108.

Figure 7:
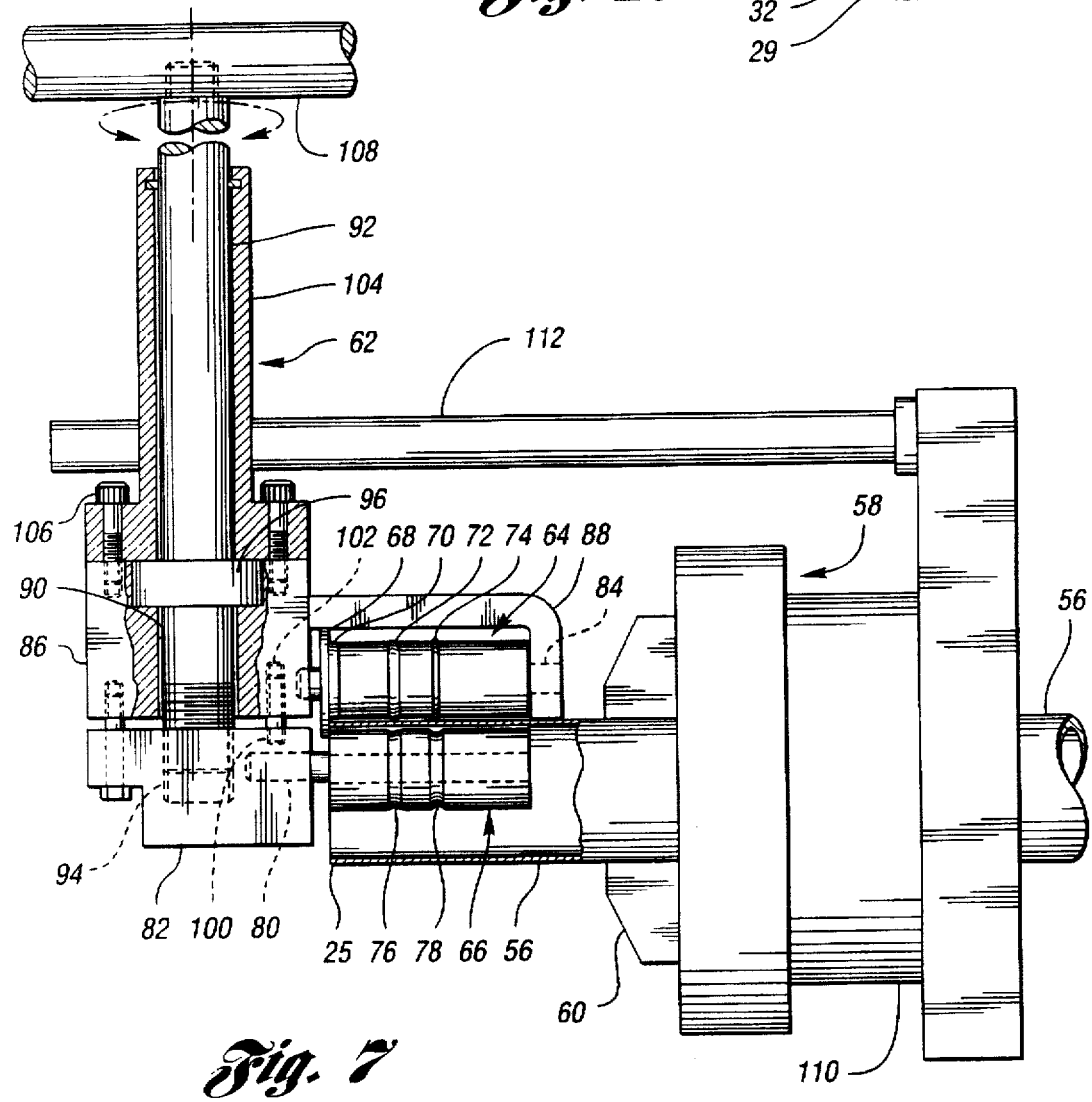
FIG. 7 shows a tool for deforming the end of a pipe to make it suitable as a male member for the connector with a plate inserted prior to deformation.

To use the tool, inner roller 66 is inserted into the interior of tube 56 until the end of the tube contacts abutment of the outer roller 64. At this point, the inner roller would normally not contact the inner surface of the tube. The hand grip is then turned so to screw the handle rod further into the end body portion. This will result in the washer moving towards the end body portion and will push the movable body portion towards the end body portion. The net result is that the two rollers will move towards one another, the handle grip 108 should be turned until the inner roller lies flat against the inner surface of the tube and the first of the outer roller annular ridges abut the outer surface of the pipe so to hold the tool in place against the tube as shown in FIG. 7. At this point, the power should be turned on to the chuck motor 110 so that the tube will begin to rotate at 300 rpm. The tool should be maintained in a set position relative to the chuck. The sleeve 104 is designed to allow the handle to be pressed against a stationary object 112 to prevent tool movement but allows further rotation of the handle rod by means of the hand grip. The sleeve also prevents creep by the handle rod along the stationary surface as the hand grip is turned as would occur in the absence of the sleeve. The Ridgid 300A power drive provides a support bar 112 spaced from the center of the chuck which is suitable for this purpose.

With the tool held in place against the support bar 112, the rotation of the tube will impart corresponding rotation to the rollers in opposite directions from one another at 300 rpm. At this point, the operator should continue to turn the handle grip 108 so to cause further movement of the rollers towards one another. This effectively accomplishes the cold extrusion of the metal at the annular ridges and ramp so to create the desired bevel at the end of the male member and the notch and release grooves.

Figure 8:
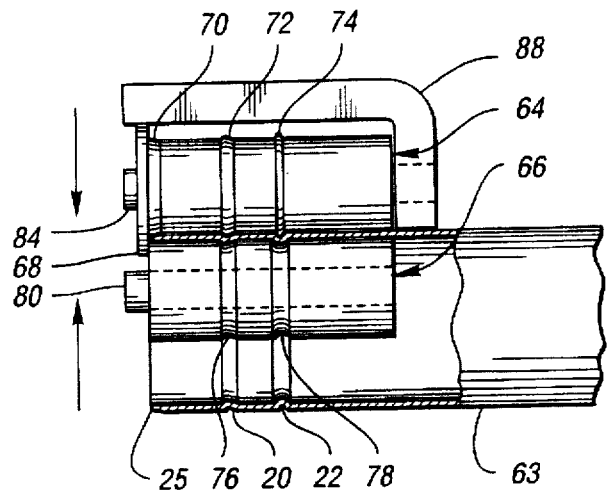
FIG. 8 is a partial view of the tool and pipe after the pipe has been deformed by the tool.

After the creation of the beveled end, notch and release groove are completed as shown in FIG. 8, the chuck may be turned off and the tool removed by reversing the direction in which the hand grips are turned until a sufficient gap is open to allow removal of the tool. Thus, it is relatively easy to create on site the necessary male members which then can be used with suitable female members, locking ring, restraint members and O-rings to provide connectors of suitable length at the site.

Figure 9:
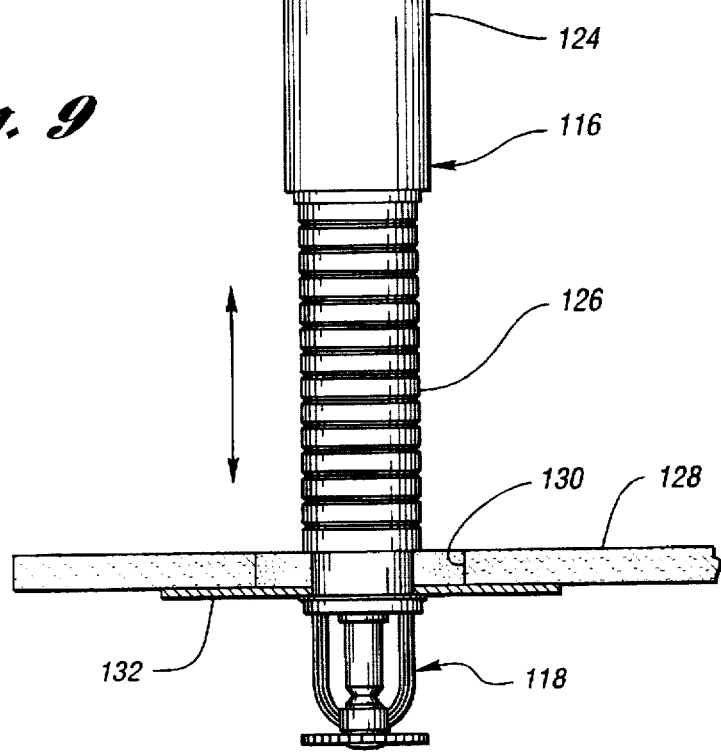
FIG. 9 is a second embodiment of the connector including a fire sprinkler including a drop pipe extending from the connector.

FIG. 9 shows an embodiment of the invention which is particularly suitable for use in connection with fire sprinkler systems and, in particular, in use with a variable length pipe connector, the details of which are disclosed in U.S. Pat. No. 5,002,318, which is incorporated by reference herein. The basic overhead sprinkler system features a source of water which is distributed through the area to be protected by horizontal supply piping concealed above the ceiling. At intervals along the supply piping 114, also called run pipe, are short sections of drop piping 116 to which the sprinkler heads 118 are to be attached. In modern office buildings, it is often desired to rearrange the walls making up the office space. At such times, it is also often desirable to change the pattern of the fire sprinklers to correspond with the new office configuration. Further, since the distance between the drop pipe and the desired position of the sprinkler head 118 may vary from location to location, the sprinkler heads commonly attached to the drop pipe by an adjustable pipe connection. Since a fire sprinkling system is normally positioned well above the floor of the office space, it is desirable to install the system as efficiently and quickly as possible with minimal use of tools.

By use of the current invention, a sprinkler system can be installed, maintained and rearranged with relative ease. Once the desired positions of the sprinkler heads 118 are determined, the installer will cut and form the necessary lengths of male piping 114 using thin walled tubing which will become the runs of supply piping. Female coupling members 120 have openings created at a location between the seal cavities 122 to which a downward extending female drop pipe 124 will be joined. The female coupling and female drop pipe will be normally brazed together. The female drop pipe is designed for insertion of a corresponding male drop pipe 126 in a manner taught by U.S. Pat. No. 5,002,318. The male run piping and female couplings (with female drop pipes attached) are then positioned throughout the area to be protected as desired. This can be done overhead without the use of any tooling and less skilled laborers. Once ceiling tile 128 is positioned with suitable openings 130 for the fire sprinkler drop pipe, the male drop tube is then positioned through the opening into the female drop tube with a suitable ornamental plate 132 covering the remainder of the opening. The head 118 of the sprinkler then is properly positioned in relation to with the ceiling tile. This likewise is accomplished without the need for any tools providing an easy and efficient installation. Should at a later time it be desired to move any portion of the system, the ceiling tile need only be removed and the connections between the female and male members be released by removal of the insertion restraint members 134 and use of the respective release grooves in both run and drop male members. New piping of the new desired configuration can then be positioned as desired.

What is claimed is:

1. A quick connect telescopic connecter comprising:
    a male member and a female member having an end portion, the members engageable in telescopic relation with the male member entering into the female member through the female member end portion and configured to provide a gap between the members sufficient to allow relative axial movement;
    said female member having a recess in communication with the gap with a section of the recess forming a camming surface;
    said male member having a first notch axially alignable with the recess in said female member;
    a spring normally positioned within the female recess for selectively restricting said members against movement of withdrawal of the male member in an axial direction and releasing said members for unrestricted axial movement;
    said spring having a outer diameter which will span the gap when the spring is in a seated position within the male member first notch and where an attempt to withdraw the male member when the spring is in the notch will cause the camming surface to wedge the spring into the seated position within the notch thereby defining a maximum withdrawal position with respect to the members;
    an insertion restraint member for selectively restricting said members against relative movement of the male member into the female member in an axial direction and for releasing said members for unrestricted axial movement;
    the male member having a second notch axially outward of the female member end portion when the members are in the maximum withdrawal position; and
    the insertion restraint member positioned in the second notch, attempted movement of the male member into the female member will be limited by the abutment of the insertion restraint member against the female member end portion.

2. The connecter of claim 1 wherein the insertion restraint member has a portion for abutment with the female end portion and the abutment portion will intentionally fail at an stress above those normally incurred in use to allow further movement of the male member into the female member.

3. The connecter of claim 1 wherein the insertion restraint member is a second spring.

4. The connecter of claim 3 wherein the second spring is frangible at a previously determined stress level.

5. The connecter of claim 3 wherein the second spring is interchangeable with the first spring.

6. The connecter of claim 1 wherein the second notch has a depth that allows the spring to move out of the recess and the male member to be removed.

7. The connecter of claim 1 wherein the second notch is a axial distance from the first notch so that when the insertion restraint member is positioned in the second notch essentially no axial movement between the members can occur.

8. The connecter of claim 1 wherein the male member is a thin walled tube.

9. A method for maintaining a male member with a telescopic end and first and second notches, and a female member, with an end for receiving the male telescopic end in a recess, which members are configured to provide a gap therebetween sufficient to allow relative axial movement, in a relative telescopic relationship with a defined amount of axial movement allowed, comprising the steps of:
    positioning in the recess a spring having a normal outer diameter allowing a portion to extend into the recess with a thickness that spans the gap;
    inserting said male member into the female member through said spring until the first notch is aligned with the first spring;
    moving the male member axially in an outward direction until a cam portion of the recess seats the spring within the first notch to wedge the spring between the members to prevent further outward movement;
    positioning an insertion restraint member in the second notch which will abut the female member during inward axial movement to prevent further inward movement.

10. A method of the claim 9 including the further step of the insertion restraint member yielding under an increased stress to avoid effectively abutting the female member so that further inward movement is allowed.

11. A piping system comprising a plurality of couplings, each having at least one opening portion;

a plurality of supply pipes, each having an end portion which can be inserted in telescopic fashion into a respective opening portion of the coupling members while providing a gap therebetween to allow relative axial movement between the pipe and coupling portions;

each female opening portion having a recess in communication with the gap, with a section of the recess forming a camming surface, and an opening end;

each pipe insertion portion having a pair of notches axially alignable with the recess in said opening portion;

a pair of springs associated with each opening portion which are removably positionable within the notches, said springs having an outer diameter which will normally span the gap between the portions;

the first of each pair of said springs removably in an operative position in both the opening recess and the first notch for selectively restricting said portions against movement of withdrawal of the insertion portion in an axial direction and when not in the operative position for releasing said portions for axial movement unrestricted by the first spring;

the second of each pair of said springs removably in a operative position in the second notch for selectively restricting said portions against relative movement of the insertion portion into the female member in an axial direction and when not in the operative position for releasing said members for axial movement unrestricted by the second spring;

the first spring in its operative position interacting with the camming surface upon attempted withdrawal of the insertion portion to cause the first spring to be wedged into a seated position within the notch with the effective outer diameter of the first spring still spanning the gap thereby preventing further withdrawal;

the second spring in the operative position abutable with the end of the coupling portion to limit further insertion of the insertion portion into the opening portion by the spring abutting against the opening portion end.

12. The piping system of the claim 11 wherein the distance between the first and second notches corresponds to the distance between the opening portion recess and end so to prevent substantially any movement between the portions when the springs are in their operative positions.

13. The piping system of the claim 11 wherein the second spring is designed to fail at an elevated level of stress to allow further movement between the portions.

14. The piping system of the claim 11 wherein fire sprinkler drop pipes extend downward from selected couplings.

15. The piping system of the claim 11 wherein the springs are interchangeable.

* * * * *